(12) United States Patent
Favero et al.

(10) Patent No.: US 11,618,848 B2
(45) Date of Patent: Apr. 4, 2023

(54) REVERSE EMULSION FOR HYDRAULIC FRACTURATION

(71) Applicant: S.P.C.M. SA, Andrezieux-Boutheon (FR)

(72) Inventors: Cédrick Favero, Andrezieux (FR); Bruno Tavernier, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 0 days.

(21) Appl. No.: 17/082,397

(22) Filed: Oct. 28, 2020

(65) Prior Publication Data
US 2021/0122969 A1    Apr. 29, 2021

(30) Foreign Application Priority Data
Oct. 28, 2019 (FR) ...................... 19 12048

(51) Int. Cl.
| | |
|---|---|
| *C09K 8/64* | (2006.01) |
| *C09K 8/60* | (2006.01) |
| *C09K 8/80* | (2006.01) |
| *E21B 43/26* | (2006.01) |
| *C08L 33/26* | (2006.01) |

(52) U.S. Cl.
CPC ............... *C09K 8/64* (2013.01); *C08L 33/26* (2013.01); *C09K 8/602* (2013.01); *C09K 8/80* (2013.01); *E21B 43/26* (2013.01); *C09K 2208/28* (2013.01)

(58) Field of Classification Search
CPC .......... C08L 33/26; C08L 91/00; C08L 93/00; C08L 2201/54; C09K 2208/28; C09K 8/602; C09K 8/64; C09K 8/80; E21B 43/26
See application file for complete search history.

(56) References Cited

U.S. PATENT DOCUMENTS

| | | | |
|---|---|---|---|
| 7,004,254 B1 * | 2/2006 | Chatterji | C09K 8/12 166/279 |
| 10,647,908 B2 * | 5/2020 | Favero | E21B 43/26 |
| 10,975,290 B2 * | 4/2021 | Favero | C08F 2/30 |

* cited by examiner

*Primary Examiner* — Alicia Bland
(74) *Attorney, Agent, or Firm* — B. Aaron Schulman, Esq.; Stites & Harbison, PLLC

(57) ABSTRACT

The present application concerns a water-in-oil inverse emulsion comprising:
oil;
water;
at least one water-soluble anionic polymer of average molecular weight higher than 3 million daltons, containing between 4 and 14 mol % of sulfonated anionic monomers, between 0 and 17 mol % of carboxylated anionic monomers and between 69 and 94 mol of nonionic monomers;
at least one inverting agent and at least one emulsifying agent, the weight ratio R between the total amount of inverting agent and the total amount of emulsifying agent being higher than 1.8;
the inverting agent being selected from among an ethoxylated nonylphenol preferably having between 4 and 10 ethoxylations; an ethoxylated/propoxylated alcohol preferably having ethoxylations/propoxylations to obtain a total number of carbons of between C12 and C25, an ethoxylated tridecylic alcohol and an ethoxylated/propoxylated fatty alcohol;
the emulsifying agent being selected from among sorbitan monooleate, polyethoxylated sorbitan esters or the diethanolamide of tall oil fatty acids, polyethoxylated fatty acids,
and use thereof for hydraulic fracturing.

17 Claims, No Drawings

REVERSE EMULSION FOR HYDRAULIC FRACTURATION

The present invention concerns the technical field of polymers in the form of a water-in-oil emulsion, also called inverse emulsion. More specifically, the subject of the invention is an inverse emulsion containing a stable anionic polymer under conditions of high salinity.

Other aspects of the invention concern a method for preparing a fracturing fluid and a process for hydraulic fracturing of unconventional underground oil and gas reservoirs using said inverse emulsion, and finally a last aspect of the invention concerns a method for reducing friction of a fracturing fluid in a hydraulic fracturing operation.

PRIOR STATE OF THE ART

The production of oil (hydrocarbons) and gas contained in unconventional underground reservoirs has been undergoing development for several years and requires the opening of fractures in the reservoir for economic production of oil and gas.

In the remainder of the description of the prior art and of the invention, «unconventional underground reservoirs», designates deposits necessitating special extraction technologies since they do not exist in the form of an accumulation in porous, permeable bedrock (cf. *Les hydrocarbures de roche-mère en France Rapport provisoire—CGIET n° 2011-04-G Ministère de l'écologie, du développement durable, des transports et du logement—Avril* 2011) (Source rock hydrocarbons in France, provisional report—Ministry for ecology, sustainable development, transport and housing—April 2011). For unconventional gas, mention can be made of shale gas, coalbed methane, or tight gas. For unconventional oil, mention can be made of heavy oil, shale oil or tight oil.

The deposits contained in unconventional reservoirs are enormous and vastly expansive in areas previously unable to be extracted such as source rock hydrocarbons e.g. argillaceous shale, tight gas and coalbed methane. In the United States, shale gas is widely produced and currently represents 46% of the total amount of natural gas produced in the United States whereas it only represented 28% in 1998. The largest gas fields are known under the names Barnett Shale, Ville Fayette Shale, Mowry Shale, Marcellus Shale, Utica Shale . . . . The drilling of tight reservoirs has been made possible through progress in drilling techniques.

Production techniques have evolved from vertical wells to horizontal wells, reducing the number of production wells required and the ground imprint thereof allowing better coverage of reservoir volume to recover a maximum amount of gas. However, permeabilities are insufficient for the gas to migrate easily from bedrock to well for economic production of gas or oil in large quantities. It is therefore necessary to increase permeability and production surfaces via stimulation operations, in particular via hydraulic fracturing of the rock in contact with the well.

Hydraulic Fracturing

The objective of hydraulic fracturing is to create additional permeability and to generate larger production surfaces of gas or oil. Low permeability, the natural barriers of tight layers and impermeabilization through drilling operations strongly limit production. The gas or oil contained in an unconventional reservoir is unable to migrate easily from bedrock to well without stimulation.

These hydraulic fracturing operations on horizontal wells started in 1960 in the Appalachian region, and as of today several ten thousand operations have taken place in the United States.

Research, reservoir modelling, drilling, cementing and stimulation technologies have become increasingly more sophisticated using equipment allowing these operations to be carried out in ever shorter periods of time with accurate analysis of results.

Reservoir Stimulation via Hydraulic Fracturing

For these operations, water is injected under high pressure and strong flow rate to create fractures distributed perpendicular to the production well. In general, this takes place in several steps to create fractures along the entire length of the horizontal well, allowing coverage of maximum reservoir volume.

To hold these fractures open, proppants are added (e.g. sand, plastic materials, calibrated ceramics) to prevent closing of these fractures and to maintain the capillarity created once injection is halted.

To reduce the hydraulic power required for rapid injection of water or brine into the underground formation, polymers known as friction reducers are used. The use of said polymers allows a reduction of up to 70% of pressure losses due to internal friction within the fluid.

Polymers in inverse emulsion form are routinely used on account of their ease of use. The use thereof is based on dissolution of the polymer in water or brine. For this purpose, the inverse emulsion inverts to release the polymer contained in the water phase of the inverse emulsion. After release, the polymer comes to be contained in the water or brine to which the inverse emulsion has been added.

Fracturing fluids are increasingly more based on water containing high amounts of dissolved salts. Within this context, the industry requires friction reducers which operate efficiently in high salt brines (with high concentration of dissolved salts) of which some can contain more than 30 000 mg·L-1 of dissolved salts, even more than 100 000 mg·L-1, in particular having high contents of divalent salts.

DESCRIPTION OF THE INVENTION

The Applicant has surprisingly discovered that an inverse water-in-oil emulsion of specific composition gives higher friction-reducing performance under conditions of very strong salinity with high contents of divalent salts.

The invention also concerns a method for preparing a fracturing fluid using the emulsion of the invention.

A third aspect of the invention concerns a hydraulic fracturing process for which the injection fluid has been prepared according to the preceding method of the invention.

Finally, a last aspect of the invention concerns a method for reducing the friction of a fracturing fluid in a hydraulic fracturing operation using the emulsion of the invention.

More specifically, the invention first concerns an inverse water-in-oil emulsion comprising:
oil;
water;
at least one water-soluble anionic polymer of average molecular weight higher than 3 million daltons, containing between 4 and 14 mol % of sulfonated anionic monomers, between 0 and 17 mol % of carboxylated anionic monomers and between 69 and 96 mol % of nonionic monomers;

at least one inverting agent and at least one emulsifying agent, the weight ratio R between the total amount of inverting agent and the total amount of emulsifying agent being higher than 1.8;

the inverting agent being selected from among an ethoxylated nonylphenol, preferably having between 4 and 10 ethoxylations; an ethoxylated/propoxylated alcohol preferably having ethoxylations/propoxylations to obtain a total number of carbons of between C10 and C25, an ethoxylated tridecylic alcohol and an ethoxylated/propoxylated fatty alcohol, the emulsifying agent being selected from among sorbitan monooleate, polyethoxylated sorbitan esters, the diethanolamide of tall oil fatty acids or polyethoxylated fatty acids.

In the present invention, by the expression «between xxx and yyy» it is meant a range including the limits xxx and yyy.

The oil used to prepare the water-in-oil emulsion of the invention can be a mineral oil, vegetable oil, synthetic oil, or a mixture of several of these oils.

Examples of mineral oil are mineral oils containing saturated hydrocarbons of aliphatic, naphthenic, paraffinic, isoparaffinic, cycloparaffinic or naphthyl type.

Examples of synthetic oil are hydrogenated polydecene or hydrogenated polyisobutene, an ester such as octyl stearate or butyl oleate. The Exxsol® range of products by Exxon is perfectly suitable.

In general, the weight ratio of the aqueous phase to the oil phase in the inverse emulsion is preferably from 50:50 to 90:10, and more preferably from 70:30 to 80:20.

The water-in-oil emulsion advantageously comprises from 12 to 24 weight % of oil, more advantageously 15 to 22% relative to the total weight of the emulsion.

The water-in-oil emulsion advantageously comprises from 30 to 55 weight % of water, more advantageously 35 to 48 weight %, relative to the total weight of the emulsion.

Such as used herein, the term "water-soluble polymer" designates a polymer giving an aqueous solution without insoluble particles when dissolved under agitation for 4 hours at 25° C., at a concentration of 10 g·L$^{-1}$ in water.

In the present invention, the term "emulsifying agent" designates an agent capable of emulsifying water in an oil, and an "s an agent capable of emulsifying an oil in water. More specifically, it is considered that an inverting agent is a surfactant having an HLB number higher than or equal to 10, and an emulsifying agent is a surfactant having an HLB number strictly lower than 10.

The hydrophilic-lipophilic balance (HLB) of a chemical compound is a measure of the degree to which it is hydrophilic or lipophilic, determined by calculating the values of the different regions of the molecule, as described by Griffin in 1949 (Griffin W C, Classification of Surface-Active Agents by HLB, Journal of the Society of Cosmetic Chemists, 1949, 1, pages 311-326).

In the present invention, we have adopted the Griffin method whereby the calculation of a value is based on the chemical groups of the molecule. Griffin assigned a non-dimensional number of between 0 and 20 to give information on solubility in water and in oil. Substances having an HLB number of 10 are distributed between the two phases so that the hydrophilic group (molecular mass Mh) has full affinity for water whilst the hydrophobic hydrocarbon group (molecular mass Mp) is adsorbed in the non-aqueous phase.

The HLB number of a substance of total molecular mass M in which the hydrophilic portion has a molecular mass Mh, is HLB=20 (Mh/M).

The water-in-oil emulsion of the invention can be prepared with any method known to persons skilled in the art. In general, an aqueous solution comprising the monomer(s) and emulsifying agent(s) is emulsified in an oil phase. Polymerization is then performed by adding a free radical initiator. Reference can be made to redox pairs, with cumene hydroperoxide, tert-butyl hydroperoxide or persulfates among oxidizing agents, and sodium sulfite, sodium metabisulfite and Mohr's salt among reducing agents. Azo compounds such as the hydrochloride of 2,2'-azobis (isobutyronitrile) and of 2,2'-azobis (2-amidinopropane) can also be used.

Conventionally, polymerization is generally isothermal, adiabatic or conducted under controlled temperature. That is to say that the temperature is held constant, generally between 10 and 60° C. (isothermal), or else the temperature is left to increase naturally (adiabatic) and in this case the reaction is generally started at a temperature lower than 10° C. and the final temperature is generally higher than 50° C. or, finally, the temperature increase is controlled to obtain a temperature curve between the isothermal curve and adiabatic curve.

In general, the inverting agent(s) are added at the end of the polymerization reaction, preferably at a temperature lower than 50° C.

Preferably, the emulsion of the invention contains between 15 and 50 dry weight % of water-soluble polymer, more preferably between 15 and 40 dry weight % and further preferably between 15 and 25 dry weight %, relative to the total weight of the emulsion.

In another preference, for the emulsion of the invention, the weight ratio R between the total amount of inverting agent and the total amount of emulsifying agent is higher than 2, preferably higher than 2.5, more preferably higher than 3, further preferably higher than 3.5, and still further preferably higher than 4.

The water-soluble anionic polymer contained in the emulsion of the invention comprises nonionic monomers and sulfonated anionic monomers, and optionally carboxylated anionic monomers.

The nonionic monomers are preferably selected from among acrylamide, methacrylamide, N-alkylacrylamides, N-alkylmethacrylamides, N,N dialkylacrylamides, N,N dialkylmethacrylamides, acrylic esters; methacrylic esters. The preferred nonionic monomer is acrylamide.

The sulfonated anionic monomers are preferably selected from among 2-acrylamido-2-methylpropane sulfonic acid (ATBS), 2-methacrylamido-2-methylpropane acid, styrene sulfonic acid, vinylsulfonic acid, 3-sulfopropyl methacrylate, said anionic monomers being non-salified, partly or fully salified, and the salts of 3-sulfopropyl methacrylate. The preferred sulfonated anionic monomer is the salt of 2-acrylamido-2-methylpropane sulfonic acid.

The carboxylated anionic monomers are preferably selected from among acrylic acid, methacrylic acid, itaconic acid, maleic acid, said anionic monomers being non-salified, partly or fully salified. The preferred carboxylated anionic monomer is the sodium salt of acrylic acid.

The carboxylated anionic monomers optionally included in the water-soluble anionic polymer can also be the reaction product of hydrolysis of the polymer, well-known to skilled persons. For example, the acrylic acid can be the product of acrylamide hydrolysis.

Several nonionic and anionic monomers can be selected to form the water-soluble anionic polymer of the invention. Advantageously, the water-soluble anionic polymer is a polymer of acrylamide and the sodium salt of 2-acrylamido-2-methylpropane sulfonic acid.

The water-soluble anionic polymer has an average molecular weight higher than 3 million daltons. Preferably, this average molecular weight is between 3 and 30 million daltons and more preferably between 8 and 18 million daltons.

The "average molecular weight" in the present invention is determined by intrinsic viscosity. Intrinsic viscosity can be measured with methods known to persons skilled in the art and can be calculated in particular from values of reduced viscosity as a function of different concentrations using a graph method by plotting the values of reduced viscosity (along the Y-axis) against concentrations (along the X-axis) and extrapolating the curve to zero concentration. The value of intrinsic viscosity is read along the Y-axis or using the least squares method. The average molecular weight can then be determined using the well-known Mark-Houwink equation:

$$[\eta]=KM^\alpha$$

[η] represents the intrinsic viscosity of the polymer, determined by the method measuring viscosity in solution;

K represents an empirical constant;

M represents the average molecular weight of the polymer;

α represents the Mark-Houwink coefficient;

α and K, are dependent on the particular polymer-solvent system.

The emulsion of the invention preferably contains between 0.5 and 10 weight % of inverting agent and between 0.5 and 16 weight % of emulsifying agent, relative to the total weight of the emulsion.

The water-in-oil emulsion advantageously comprises from 0.8 to 2 weight % of at least one emulsifying agent, relative to the total weight of the emulsion.

The water-in-oil emulsion preferably comprises from 1.5 to 8 weight % of at least one inverting agent, relative to the total weight of the emulsion.

Optionally, the water-in-oil emulsion comprises from 1 to 40 weight % of salts, preferably 3 to 30 weight %, more preferably 5 to 25 weight % and further preferably 7 to 17 weight % of salts, relative to the total weight of the emulsion.

For example, the salts contained in the water-in-oil emulsion can be sodium salts, lithium salts, potassium salts, magnesium salts, aluminium salts, ammonium salts, phosphate salts, sulfate salts, chloride salts, citrate salts, acetate salts, hydrogen phosphate tartrate salts, water-soluble inorganic salts or other inorganic salts and mixtures thereof. These salts comprise sodium chloride, sodium sulfate, sodium bromide, calcium chloride, ammonium sulfate, ammonium chloride, lithium chloride, lithium bromide, potassium chloride, potassium bromide, magnesium sulfate, aluminium sulfate, sodium hydrogen phosphate, potassium hydrogen phosphate and mixtures thereof. Sodium chloride, calcium chloride, ammonium chloride, ammonium sulfate are preferred, and the mixtures thereof are further preferred.

A further aspect of the invention concerns a method for preparing a fracturing fluid, comprising:
a) Providing an inverse emulsion of the invention;
b) Inverting the inverse emulsion through the addition thereof to brine containing more than 30 000 ppm of salts and with a divalent ratio R$^+$ higher than or equal to 0.15, R$^+$ being the weight ratio: divalent salts/total salts;
c) Optionally adding at least one proppant.

By total salts, it is meant the total quantity of salt in the brine.

The brine can contain monovalent and/or polyvalent salts or combinations thereof. Examples of salts include, but not limited thereto, sodium, lithium, potassium, aluminium, phosphate, sulfate, magnesium, barium, nitrate salts and other inorganic salts and mixtures thereof.

The brine preferably contains at least one of the following elements: sodium chloride, calcium chloride, sodium bromide, calcium bromide, barium chloride, magnesium chloride, zinc bromide, sodium formate and potassium formate.

Preferably, the brine used to prepare the fracturing fluid contains more than 70 000 ppm of salts and more preferably more than 100 000 ppm of salts, preferably the brine contains from 70 000 to 350 000 ppm of salts, more preferably from 100 000 to 350 000 ppm.

In one advantageous embodiment of the method for preparing the fracturing fluid:
when the brine comprises from 30 000 ppm to 70 000 ppm (upper limit excluded) of salts (step b), the ratio R of the emulsion (step a) is preferably higher than 1.8;
when the brine comprises from 70 000 ppm to 100 000 ppm (upper limit excluded), the ratio R of the emulsion is preferably higher than 2;
when the brine comprises from 100 000 ppm to 150 000 ppm (upper limit excluded) of salts, the ratio R of the emulsion is preferably higher than 2.5;
when the brine comprises from 150 000 ppm to 200 000 ppm (upper limit excluded) of salts, the ratio R of the emulsion is preferably higher than 3;
when the brine comprises from 200 000 ppm to 250 000 ppm (upper limit excluded) of salts, the ratio R of the emulsion is preferably higher than 3.5; and
when the brine comprises more than 250 000 ppm (upper limit excluded) of salts, the ratio R of the emulsion is preferably higher than 4.

Preferably, the divalent ratio R$^+$ equal to the weight ratio: divalent salts/total salts, is higher than or equal to 0.20, and more preferably R$^+$ is higher than or equal to 0.25.

The inverting of the emulsion of the invention in brine can advantageously be performed with the device and method in US 8, 383, 560 where the emulsion is continuously dissolved with a multiple static mixer arrangement.

The present invention also concerns the fracturing fluid obtained with the method of the invention in particular a fracturing fluid comprising:
A brine solution;
A water-soluble anionic polymer of the invention;
The oil of the inverse emulsion of the invention;
Water.

The proppant can be selected from, but not limited thereto, sand, ceramic, bauxite, glass beads, resin-impregnated sand. It preferably represents from 0.5 to 40 weight %, more preferably 1 to 25 weight % and further preferably 1.5 to 20 weight % of the fracturing fluid.

The fracturing fluid of the invention preferably comprises between 0.01 and 3 weight of water-soluble anionic polymer of the invention (added in emulsion form), and more preferably between 0.025 and 1 weight % relative to the total weight of the fracturing fluid.

The brine forming the fracturing fluid may comprise other compounds known to persons skilled in the art, such as those cited in document SPE 152596, for example:
Anti-clay swelling agents such as potassium chloride or choline chloride; and/or
Biocides to prevent the development of bacteria, in particular sulfate-reducing bacteria able to form viscous masses reducing passage surfaces. Mention can be made for example of glutaraldehyde which is the most widely used, or formaldehyde or isothiazolinones; and/or Oxygen reducers such as ammonium bisulfite to prevent the destruction of other components via oxidation and corrosion of injection tubes; and/or Anticorrosion additives to protect tubes against oxidation by residual amounts of oxygen, preference being given to N,N dimethylformamide; and/or Lubricants such as oil distillates; and/or Iron chelating agents such as citric acid, EDTA (ethylenediaminetetraacetic acid), phosphonates; and/or Scale inhibitors such as phosphates, les phosphonates, polyacrylates or ethylene glycol.

In one preferred embodiment, the method for preparing a fracturing fluid comprises:

a) Providing an inverse emulsion of the invention containing at least between 15 and 25 weight % of water-soluble anionic polymer, relative to the total weight of the emulsion, containing between 4 and 14 mol % of the sodium salt of 2-acrylamido-2-methylpropane sulfonic acid, between 0 and 17% of sodium acrylate and between 69 and 96 mol % of acrylamide; at least one inverting agent and at least one emulsifying agent, the weight ratio R between the total amount of inverting agent and the total amount of emulsifying agent being higher than 2.5;

b) Inverting the inverse emulsion through the addition thereof to brine containing more than 100 000 ppm of salts and with a divalent ratio $R^+$ higher than or equal to 0.2, $R^+$ being the weight ratio: divalent salts/total salts, to obtain a weight concentration of water-soluble anionic polymer in the injection fluid of between 0.05 and 1%.

c) Optionally, adding at least one proppant.

A third aspect of the invention concerns a process for the hydraulic fracturing of an unconventional underground reservoir of oil or gas, comprising preparing a fracturing fluid such as previously described and injecting said fracturing fluid into an underground formation.

More specifically, the invention concerns a process for fracturing an underground formation, comprising:

aa) providing a fracturing fluid obtained according to the previously described preparation method;

bb) injecting the injection fluid into a portion of the underground formation;

cc) fracturing the underground formation with the injection fluid;

dd) recovering a mixture of gas, oil and aqueous fluid.

Injection is conducted under pressure to create fractures along the length of the production well.

Optionally, after creating the fractures, at least one oxidizing compound and/or at least one surfactant compound is injected into the reservoir.

The injection of these compounds allows the restoring of fluid viscosity close to that of water.

As oxidizing compound, mention can be made of bleach (aqueous solution of a hypochlorite salt), hydrogen peroxide, ozone, chloramines, persulfates, permanganates or perchlorates.

The chemical nature of the surfactant compound(s) is not critical. They can be anionic, nonionic, amphoteric, zwitterionic and/or cationic. Preferably, the surfactants compound (s) of the invention carry anionic charges.

Preferably, the surfactant compounds used are selected from among anionic surfactants and the zwitterions thereof selected from the group comprising derivatives of alkylsulfates, of alkylethersulfates, of arylalkylsulfates, of arylalkylethersulfates, of alkylsulfonates, of alkylethersulfonates, of arylalkylsulfonates, of arylalkylethersulfonates, of alkylphosphates, of alkyletherphosphates, of arylalkylphosphates, of arylalkyletherphosphates, of alkylphosphonates, of alkyletherphosphonates, of arylalkylphosphonates, of arylalkyletherphosphonates, of alkylcarboxylates, of alkylethercarboxylates, of arylalkylcarboxylates, of arylalkylethercarboxylates, of alkyl polyethers, of arylalkyl polyethers.

Finally, a fourth and final aspect of the invention concerns a method for reducing fracturing fluid friction in a hydraulic fracturing operation on an unconventional underground reservoir of oil or gas, comprising the preparation of a fracturing fluid such as previously described and the injection of said fracturing fluid into an underground formation.

By reducing friction, it is possible to reduce or eliminate losses due to friction when injecting the fracturing fluid.

For hydraulic fracturing, friction reduction implies that the polymer of the fracturing fluid imparts rheofluidifying properties to the solution, to obtain relatively low viscosity at the time of injection (under high shear) and strong viscosity to hold the proppant in suspension at the fracture when shear decreases.

The invention and resulting advantages thereof will become clearly apparent from the following examples of embodiment.

EXAMPLES

Example 1

Emulsion Containing 20.00 Weight % of a Polymer Comprising 2 Mol % of Sulfonated Monomers An aqueous phase was prepared with 37.50 weight % of acrylamide solution (at 50 weight % in water), 2.50 weight % of ATBS.Na solution (sodium 2-acrylamido-2-methylpropane sulfonate at 50 weight % in water), 34.90 weight % of deionised water and 0.02 weight % of Versenex 80.

An oil phase was prepared from 23.45 weight % of oil (Exxsol® D100 S) and the following emulsifying agents: 1.16 weight % of Witcamide®511 (diethanolamine of tall oil fatty acids), 0.16 weight % of Span® 80 (sorbitan monooleate) and 0.23 weight % of Tween® 81 (sorbitan monooleate 5EO).

The aqueous phase was added to the oil phase under mixing to form an emulsion. The resulting dispersion was placed under nitrogen bubbling for 30 minutes while stabilising the temperature at 25° C., at which time 0.002 weight % of peroxide was added to the emulsion and a 0.075 weight % solution of sodium metabisulfite (MBS) was added to the dispersion at a flow rate of 0.1 millilitre per minute. The polymerization temperature was controlled at between 38° C. and 42° C. for about 90 minutes. The residual monomers were trapped by adding a 0.03 weight % solution of sodium metabisulfite (MBS) at a flow rate of 1.0 millilitre per minute. A water-in-oil polymer emulsion was obtained containing 20% of active acrylamide polymer and ATBS.Na.

1.75 weight % of inverting agent (Marlophen® NP 8, ethers of nonylphenol and polyethylene glycol 8 OE) were added to the water-in-oil polymer emulsion to facilitate adjustment at time of use. The weight ratio R was 1.5.

Example 2

Emulsion Containing 20.00 Weight % of Polymer Comprising 10 Mol % of Sulfonated Monomers An aqueous phase was prepared with 29,50 weight % of acrylamide solution (at 50 weight % in water), 10.50 weight % of ATBS.Na solution (sodium 2-acrylamido-2-methylpropane sulfonate at 50 weight % in water), 34.90 weight % of deionised water and 0.02 weight % of Versenex 80.

An oil phase was prepared from 23.45 weight % of oil (Exxsol® D100 S) and the following emulsifying agents: 1.16 weight % of Witcamide®511 (diethanolamine of tall oil fatty acids), 0.16 weight % of Span® 80 (sorbitan monooleate) and 0.23 weight % of Tween® 81 (sorbitan monooleate 5EO).

The aqueous phase was added to the oil phase under mixing to form an emulsion. The resulting dispersion was placed under nitrogen bubbling for 30 minutes while stabilising the temperature at 25° C., at which time 0.002 weight % of peroxide was added to the emulsion and a 0.075 weight % solution of sodium metabisulfite (MBS) was added to the dispersion at a flow rate of 0.1 millilitre per minute. The polymerization temperature was controlled at between 38° C. and 42° C. for about 90 minutes. The residual monomers were trapped by adding a 0.03 weight % solution of sodium metabisulfite (MBS) at a flow rate of 1.0 millilitre per minute. A water-in-oil polymer emulsion was obtained containing 20 active acrylamide polymer and ATBS.Na.

1.75 weight % of inverting agent (Marlophen® NP 8, ethers of nonylphenol and polyethylene glycol 8 OE) were added to the water-in-oil polymer emulsion to facilitate adjustment at time of use. The weight ratio R was 1.5.

Example 3

Emulsion Containing 20.00 Weight % of Polymer Comprising 18 Mol % of Sulfonated Monomers An aqueous phase was prepared with 23.40 weight % of acrylamide solution (at 50 weight % in water), 16.60 weight % of ATBS.Na solution (sodium 2-acrylamido-2-methylpropane sulfonate at 50 weight % in water), 34.90 weight % of deionised water and 0.02 weight % of Versenex 80.

An oil phase was prepared from 23.45 weight % of oil (Exxsol® D100 S) and the following emulsifying agents: 1.16 weight % of Witcamide®511 (diethanolamine of tall oil fatty acids), 0.16 weight % of Span® 80 (sorbitan monooleate) and 0.23 weight % of Tween® 81 (sorbitan monooleate 5EO).

The aqueous phase was added to the oil phase under mixing to form an emulsion. The resulting dispersion was placed under nitrogen bubbling for 30 minutes while stabilising the temperature at 25° C., at which time 0.002 weight % of peroxide was added to the emulsion and a 0.075 weight % solution of sodium metabisulfite (MBS) was added to the dispersion at a flow rate of 0.1 millilitre per minute. The polymerization temperature was controlled at between 38° C. and 42° C. for about 90 minutes. The residual monomers were trapped by adding a 0.03 weight % solution of sodium metabisulfite (MBS) at a flow rate of 1.0 millilitre per minute. A water-in-oil polymer emulsion was obtained containing 20 active acrylamide polymer and ATBS.Na.

1.75 weight % of inverting agent (Marlophen® NP 8, ethers of nonylphenol and polyethylene glycol 8 OE) were added to the water-in-oil polymer emulsion to facilitate adjustment at time of use. The weight ratio R was 1.5.

Examples 4 to 9

The following examples were conducted with a weight ratio R of the invention. Examples 4 and 7, then 5 and 8 and finally 6 and 9 were respectively conducted following the same method as in examples 1, 2 and 3 but with greater quantities of Marlophen® NP 8 (inverting agent).

Example 10

Emulsion Containing 20.00 Weight % of Polymer Comprising 5 Mol % of Sulfonated Monomers and 15 Mol % of Carboxylated Monomers An aqueous phase was prepared with 28.70 weight % of acrylamide solution (at 50 weight % in water), 5.14 weight % of ATBS.Na solution (sodium 2-acrylamido-2-methylpropane sulfonate at 50 weight % in water), 2.42% weight of acrylic acid (at 100%), 2.69 weight % of sodium hydroxide solution (at 50 weight % in water), 35.95 weight % of deionised water and 0.02 weight % of Versenex 80.

An oil phase was prepared from 23.45 weight % of oil (Exxsol® D100 S) and the following emulsifying agents: 1.16 weight % of Witcamide®511 (diethanolamine of tall oil fatty acids), 0.16 weight % of Span® 80 (sorbitan monooleate) and 0.23 weight % of Tween® 81 (sorbitan monooleate 5EO).

The aqueous phase was added to the oil phase under mixing to form an emulsion. The resulting dispersion was placed under nitrogen bubbling for 30 minutes while stabilising the temperature at 25° C., at which time 0.002 weight % of peroxide was added to the emulsion and a 0.075 weight % solution of sodium metabisulfite (MBS) was added to the dispersion at a flow rate of 0.1 millilitre per minute. The polymerization temperature was controlled at between 38° C. and 42° C. for about 90 minutes. The residual monomers were trapped by adding a 0.03 weight % solution of sodium metabisulfite (MBS) at a flow rate of 1.0 millilitre per minute. A water-in-oil polymer emulsion was obtained containing 20 active acrylamide polymer and ATBS.Na.

1.75 weight % of inverting agent (Marlophen® NP 8, ethers of nonylphenol and polyethylene glycol 8 OE) were added to the water-in-oil polymer emulsion to facilitate adjustment at time of use. The weight ratio R was 1.5.

Examples 11 and 12

The following examples were conducted with a weight ratio R of the invention. Examples 11 and 12 were respectively conducted following the same method as in Example 10 but with greater quantities of Marlophen® NP 8 (inverting agent).

Table 1 describes the weight ratio R for each example.

TABLE 1

Weight ratios R of the water-in-oil emulsions.

| Example | Weight ratio R | Sulfonated monomer (mol %) | Carboxylated monomer (mol %) | Inverting agent (varying amounts according to example) |
|---|---|---|---|---|
| 1 | 1.5 | 2 | 0 | Marlophen ® NP 8 |
| 4 | 2.5 | | | |
| 7 | 4.0 | | | |
| 2 | 1.5 | 10 | 0 | |
| 5 | 2.5 | | | |
| 8 | 4.0 | | | |
| 3 | 1.5 | 18 | 0 | |
| 6 | 2.5 | | | |
| 9 | 4.0 | | | |

TABLE 1-continued

Weight ratios R of the water-in-oil emulsions.

| Example | Weight ratio R | Sulfonated monomer (mol %) | Carboxylated monomer (mol %) | Inverting agent (varying amounts according to example) |
|---|---|---|---|---|
| 10 | 1.5 | 5 | 15 | |
| 11 | 2.5 | | | |
| 12 | 4.0 | | | |

Friction Flow Loop Test

A friction flow loop was constructed from a stainless-steel tube of ¼" outer diameter and total length of 20 feet. The test solutions were pumped from the bottom of a 5-litre conical reservoir. The solution was passed through the tubing and returned to the reservoir. The flow rate was obtained using a triplex pump equipped with a speed variator.

4 litres of brine at 9% CaCl2 or API or 2× API were prepared in the sample reservoir and the pump set in operation and adjusted to deliver a flow rate of 1.5 gal/min. The brine at 9% CaCl2 corresponded to 9 g of CaCl2 in 100 ml of water, the R+ value thereof was 1.00. The API brine corresponded to 8.5 g of NaCl+2.5 g of CaCl2 in 100 ml of water, with R+ being 0.20. The 2× API brine corresponded to 17 g of NaCl+5 g of CaCl2 in 100 ml of water, with R+ being 0.20. The saline solution was recirculated until the temperature equilibrated at 25° C. and a stabilised pressure differential was reached. This pressure was recorded as "initial pressure" of the brine at 9% CaCl2 or API or 2× API.

The sample quantity of pure water-in-oil polymer emulsion was rapidly injected with a syringe into the sample reservoir containing the brine at 9% CaCl2 or API or 2× API and a chronometer was set in motion. The dose was recorded in gallons of water-in-oil emulsion per thousand gallons of brine at 9% CaCl2 or API or 2× API (gpt). The pressure was recorded every second for 5 minutes. The percentage friction reduction (% FRt) at a given time 't' was calculated on and after the drop in initial pressure ΔPi and the drop in pressure at time t, ΔPt, with the equation:

$$\% \, FRt = \frac{\Delta Pi - \Delta Pt}{\Delta Pi} \times 100$$

Results

In table 2, all the emulsions contain 20 weight % of anionic polymer.

The results show that friction-reducing performance is improved when the weight ratio R is increased. When the salt concentrations are increased, friction-reducing performance decreases. However, when the weight ratio R is selected and adapted (according to the scope of the invention), it becomes possible to obtain very good friction-reducing performance in brines and even high-salt brines.

Friction-reducing performance is improved when the percentage of sulfonated monomer in the polymer is 10 mol %. A lower sulfonated monomer percentage (2%) and higher percentage (18%) exhibit lesser performance. The presence of an anionic monomer at between 0 and 17% in addition to the sulfonated monomer also allows the obtaining of good friction-reducing performance.

The invention claimed is:

1. A water-in-oil inverse emulsion comprising:
   oil;
   water;
   at least one water-soluble anionic polymer of average molecular weight higher than 3 million daltons, containing between 5 and 10 mol % of sulfonated anionic monomers, between 0 and 17 mol % of carboxylated anionic monomers and between 73 and 95 mol % of nonionic monomers; and
   at least one inverting agent and at least one emulsifying agent, the weight ratio R between the total amount of inverting agent and the total amount of emulsifying agent is from 2.5 to 4, wherein:
   the sulfonated anionic monomers of the water-soluble anionic polymer are selected from the group consisting of 2-acrylamido-2-methylpropane sulfonic acid (ATBS), sodium salt of 2-acrylamido-2-methylpropane sulfonic acid, 2-methacrylamido-2-methylpropane acid, styrene sulfonic acid, vinylsulfonic acid and 3-sulfopropyl methacrylate, and the said anionic monomers being non-salified, partly or fully salified;
   the inverting agent is selected from the group consisting of an ethoxylated nonylphenol having between 4 and 10 ethoxylations; an ethoxylated/propoxylated alcohol preferably having ethoxylations/propoxylations to obtain a total number of carbons of between C10 and C25, and an ethoxylated tridecylic alcohol and an ethoxylated/propoxylated fatty alcohol; and
   the emulsifying agent is selected from the group consisting of sorbitan monooleate, polyethoxylated sorbitan esters, diethanolamide of tall oil fatty acids, and polyethoxylated fatty acids.

TABLE 2

| Ex: | Weight ratio R | Sulfonated monomer (mol %) | Carboxylated monomer (mol %) | % FR max in 9% CaCl$_2$ | Time (sec) for FR max in 9% CaCl$_2$ | % FR max in API brine | Time (sec) for Max FR in API brine | % FR in 2 × API brine | Time Max FR in 2 × API brine |
|---|---|---|---|---|---|---|---|---|---|
| 1 | 1.5 | 2 | 0 | 6.42 | 300 | 8.03 | 300 | 3.26 | 300 |
| 4 | 2.5 | 2 | 0 | 20.38 | 281 | 24.82 | 292 | 18.73 | 277 |
| 7 | 4 | 2 | 0 | 41.71 | 269 | 37.86 | 251 | 27.30 | 264 |
| 2 | 1.5 | 10 | 0 | 9.60 | 300 | 9.23 | 299 | 8.30 | 300 |
| 5 | 2.5 | 10 | 0 | 50.00 | 92 | 50.28 | 70 | 49.67 | 94 |
| 8 | 4 | 10 | 0 | 51.59 | 11 | 50.87 | 15 | 50.63 | 23 |
| 3 | 1.5 | 18 | 0 | 5.18 | 300 | 6.06 | 300 | 4.09 | 300 |
| 6 | 2.5 | 18 | 0 | 35.19 | 191 | 37.55 | 201 | 24.95 | 219 |
| 9 | 4 | 18 | 0 | 41.52 | 157 | 47.01 | 142 | 39.12 | 176 |
| 10 | 1.5 | 5 | 15 | 12.16 | 299 | 11.70 | 300 | 10.82 | 300 |
| 11 | 2.5 | 5 | 15 | 50.70 | 83 | 50.75 | 71 | 49.56 | 86 |
| 12 | 4 | 5 | 15 | 52.56 | 15 | 52.73 | 14 | 51.84 | 18 |

2. The emulsion according to claim 1 wherein the emulsion comprises between 15 and 50 weight % of water-soluble anionic polymer, relative to the total weight of the emulsion.

3. The emulsion according to claim 1, wherein the nonionic monomers of the water-soluble anionic polymer are selected from the group consisting of acrylamide, methacrylamide, N-alkylacrylamides, N-alkylmethacrylamides, N,N dialkylacrylamides, N,N dialkylmethacrylamides, acrylic esters; and methacrylic esters.

4. The emulsion according to claim 1, wherein the carboxylated anionic monomers of the water-soluble anionic polymer are selected from the group consisting of acrylic acid, sodium salt of acrylic acid, methacrylic acid, itaconic acid, and maleic acid, said anionic monomers being non-salified, partly or fully salified.

5. The emulsion according to claim 1, wherein the water-soluble anionic polymer has an average molecular weight of between 3 and 30 million daltons.

6. The emulsion according to claim 1, wherein the emulsion contains between 0.5 and 10 weight % of inverting agent and 0.5 and 16 weight % of emulsifying agent, relative to the total weight of the emulsion.

7. A method for preparing a fracturing fluid, comprising:
   a) providing an inverse emulsion according to claim 1,
   b) inverting the inverse emulsion through addition thereof to a brine containing more than 30 000 ppm of salts and with a divalent ratio $R^+ \geq 0.15$, $R^+$=weight ratio: divalent salts/total salts, and
   c) optionally adding at least one proppant.

8. The method for preparing a fracturing fluid according to claim 7, wherein the brine contains more than 70 000 ppm of salts.

9. The method for preparing a fracturing fluid according to claim 7, wherein the divalent ratio $R^+$ of the brine is higher than or equal to 0.20.

10. The method for preparing a fracturing fluid according to claim 7, wherein:
    a) the inverse emulsion contains at least between 15 and 25 weight %, relative to the weight of fracturing fluid, of a water-soluble anionic polymer containing between 5 and 10 mol % of the sodium salt of 2-acrylamido-2-methylpropane sulfonic acid, between 0 and 17% of sodium acrylate and between 73 and 95 mol % of acrylamide;

at least one inverting agent and at least one emulsifying agent, the weight ratio R between the total amount of inverting agent and the total amount of emulsifying agent is from 2.5 to 4, and
    b) the inverse emulsion through addition thereof to brine contains more than 100 000 ppm of salts and with a divalent ratio $R^+$ higher than or equal to 0.20, $R^+$=weight ratio: divalent salts/total salts, to obtain a weight concentration of water-soluble anionic polymer in the injection fluid of between 0.05 and 1%.

11. A process for fracturing an underground formation, comprising:
    aa) providing a fracturing fluid obtained according to the preparation method in claim 7,
    bb) injecting the injection fluid into a portion of the underground formation,
    cc) fracturing the underground formation with the injection fluid, and
    dd) recovering a mixture of gas, oil, and aqueous fluid.

12. A method for reducing the friction of a fracturing fluid in a hydraulic fracturing operation in an underground reservoir of oil or gas, comprising the preparation of a fracturing fluid according to claim 7 and the injection of said fracturing fluid into an underground formation.

13. The emulsion according to claim 1 wherein the emulsion comprises between 15 and 40 weight % of water-soluble anionic polymer, relative to the total weight of the emulsion.

14. The emulsion according to claim 1 wherein the emulsion comprises between 15 and 25 weight % of water-soluble anionic polymer, relative to the total weight of the emulsion.

15. The emulsion according to claim 1, wherein the water-soluble anionic polymer has an average molecular weight of between 8 and 18 million daltons.

16. The method for preparing a fracturing fluid according to claim 7 wherein the brine contains more than 100 000 ppm of salts.

17. The method for preparing a fracturing fluid according to claim 7, wherein the divalent ratio $R^+$ of the brine is higher than or equal to 0.25.

* * * * *